United States Patent
Williams et al.

(10) Patent No.: US 7,593,469 B2
(45) Date of Patent: Sep. 22, 2009

(54) OCAP ENGINE MODULE

(75) Inventors: George Williams, Carlsbad, CA (US);
Xudong Yu, San Diego, CA (US);
Toshiro Ozawa, San Diego, CA (US);
Rolf Toft, Carlsbad, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 750 days.

(21) Appl. No.: 11/297,588

(22) Filed: Dec. 8, 2005

(65) Prior Publication Data
US 2007/0028283 A1    Feb. 1, 2007

Related U.S. Application Data

(60) Provisional application No. 60/703,398, filed on Jul. 28, 2005.

(51) Int. Cl.
*H04B 3/00* (2006.01)
(52) U.S. Cl. ...................................... 375/257
(58) Field of Classification Search ............... 375/257, 375/259, 260, 295, 316, 324, 340; 719/328; 725/78, 25, 30, 74, 112, 113, 109; 718/100
See application file for complete search history.

(56) References Cited

U.S. PATENT DOCUMENTS

| | | | |
|---|---|---|---|
| 7,231,411 B1 * | 6/2007 | Lu | 707/204 |
| 2004/0117817 A1 | 6/2004 | Kwon et al. | |
| 2004/0139480 A1 | 7/2004 | Delpuch et al. | |
| 2005/0047596 A1 | 3/2005 | Suzuki | |
| 2005/0053090 A1 | 3/2005 | Harada et al. | |
| 2005/0081218 A1 | 4/2005 | Acott et al. | |
| 2005/0138401 A1 * | 6/2005 | Terao et al. | 713/189 |
| 2005/0204391 A1 | 9/2005 | Hunleth et al. | |
| 2005/0246707 A1 | 11/2005 | Ismail et al. | |
| 2005/0280742 A1 | 12/2005 | Jaffe | |

OTHER PUBLICATIONS

Implementing an OCAP iDCR—An Alternate Approach, Tanner, Sharp, presentation at CEA Meeting, Denver, CO, Jan. 20, 2005.
Panasonic Demonstrates World's First Interactive, OCAP-Based Cable System, Panasonic Press Release, Jan. 8, 2004.

* cited by examiner

*Primary Examiner*—Sam K Ahn
(74) *Attorney, Agent, or Firm*—Miller Patent Services; Jerry A. Miller (57) ABSTRACT

An apparatus for facilitating use of OCAP (OpenCable™ Applications Platform) standard in a host cable television device, the host cable television device having a connector consistent with certain embodiments has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. This abstract is not to be considered limiting, since other embodiments may deviate from the features described in this abstract.

26 Claims, 3 Drawing Sheets

OCAP ENGINE MODULE

CROSS REFERENCE TO RELATED DOCUMENTS

This application is related to and claims priority benefit of U.S. Provisional Patent Application No. 60/703,398, filed Jul. 28, 2005 which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

CableCARD™ devices (also known as PODs—Point Of Deployment modules) are designed for use in the cable industry and satellite television radio industry to provide conditional access functions to television host devices such as television set-top boxes, VCRs, PVRs, and television receivers. The first generation of such devices were designed to accommodate a single stream of video data. Subsequently the "OpenCable™ Specifications: Multi-Stream CableCARD™ Interface OC-SP-MC-IF-C01-050331" from Cable Labs has been introduced to provide multi stream capability for such devices. Briefly, the CableCARD™-Host interface specification defines the interface between a digital cable host device, and the CableCARD™ device. The Multi-Stream Cable-CARD™ device (also called an M-CARD) is a second generation CableCARD™ device (single stream CableCARD™ devices are also called S-CARDs). A multi-tuner Host can pass multiple channels through an M-CARD device. The above document defines an M-CARD device that can support multiple transport streams. The M-CARD device described in the above document is backward compatible with Single-Stream CableCARD™ devicess as defined via [SCTE28], the Host-POD Interface Standard [OC-CC] and the POD Copy Protection System [SCTE41], and supports multiple program decryption from multiple transport streams. The above-referenced documents are hereby incorporated herein by reference.

The OCAP (OpenCable™ Applications Platform) specifies a mechanism for Java™ programs to run, for example, to implement functions such as graphics functions and other video content. However, it is noted that although Java™ is designed to be a language that can be written once and then ported to many different processing environments, the reality is quite different and many problems can be encountered when attempting to run Java™ code on multiple environments. For example, when Java™ code is generated and debugged in a first operational environment, it may not function properly in a second operational environment. Therefore, for OCAP to become widely accepted, the Java™ code should be functional on every platform on which it is to run. This conceivably means each set of code must be individually tested with each hardware platform from all manufacturers in order to assure that the code functions properly.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "code", as used herein, is defined as a sequence of instructions designed for execution on a computer system. A "program", "code", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

In one embodiment consistent with the present invention, a CableCARD™ (S-CARD or M-CARD) can be modified to provide a video signal line to provide video graphics output by incorporating an OCAP (OpenCable™ Applications Platform) engine and stack. The resulting card can be utilized to carry out OCAP specified functions in a single Cable-CARD™ device. In such an embodiment, generally four video output lines can be provided to output RGB and α in order to provide an appropriate output for integration into a display.

OCAP specifies a mechanism for Java™ programs to run, for example, to implement functions such as graphics functions and other video content. However, it is noted that although Java™ is designed to be a language that can be written once and then ported to many different processing environments, the reality is quite different and many problems can be encountered when attempting to run Java™ code on multiple environments. By placing the OCAP engine and stack on a single processor used in conjunction with an S-CARD or M-CARD, these problems can be avoided, since a common platform is available for use across multiple hosts. In other embodiments, the OCAP module can be a single purpose device used for the purpose of standardizing the OCAP engine across multiple and various hosts. In yet other embodiments, other functionality can be combined with the OCAP module.

Figure 1:
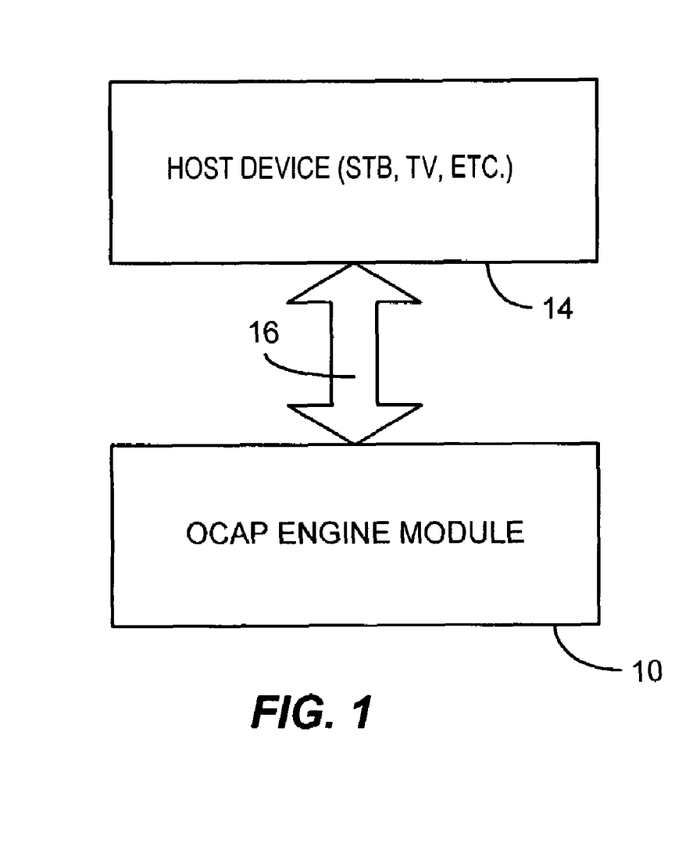
FIG. 1 shows a first embodiment of an OCAP module consistent with certain embodiments of the present invention.

FIG. 1 depicts one embodiment consistent with the present invention wherein an OCAP engine module 10 is coupled to a host device 14 (set-top box, television receiver, VCR, PVR, etc.) via an interface 16 and thereby provides the OCAP functionality for the host device 14. In this embodiment, the OCAP engine module 10 provides the benefit of having a single Java™ environment that can be used for operation across multiple hosts (such as 14 or other hosts with interface 16), which can be adapted to run the Java™ code using the OCAP module 10 and thus benefit from use of a single Java™ environment. The code writer also benefits by virtue of having to only test code in a single Java™ environment.

Figure 2:
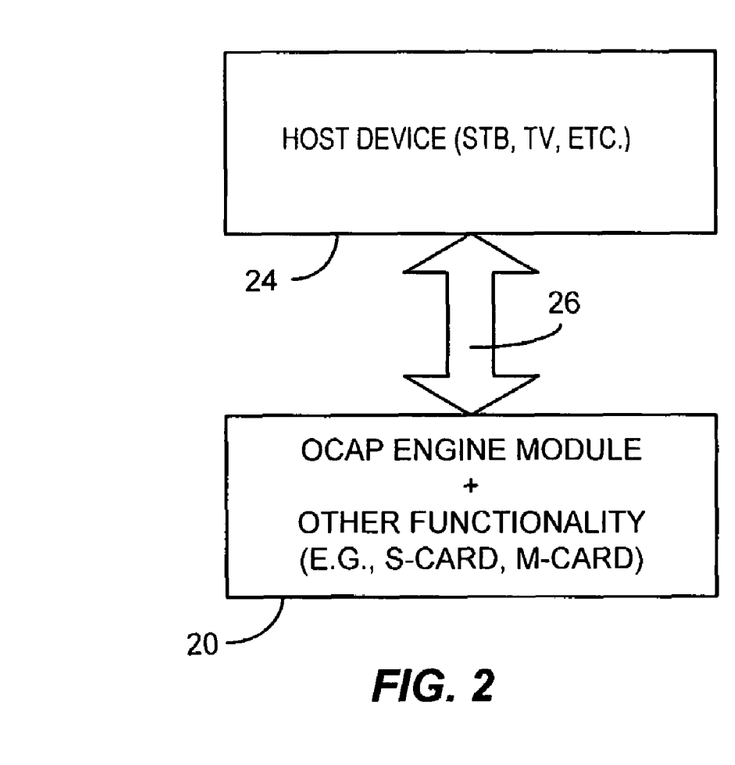
FIG. 2 shows a second embodiment of an OCAP module combined with other functionality in a manner consistent with certain embodiments of the present invention.

FIG. 2 generically depicts an OCAP engine module 20 combined with other functionality such as M-CARD or S-CARD functionality. Such a module 20 has similar benefits to that of FIG. 1, but is also adapted to operate to provide M-CARD or S-CARD functionality (or some other functionality) in addition to providing an OCAP engine, API, Hardware drivers, OCAP stack, etc. as needed to support the Java™ operating environment.

Figure 3:
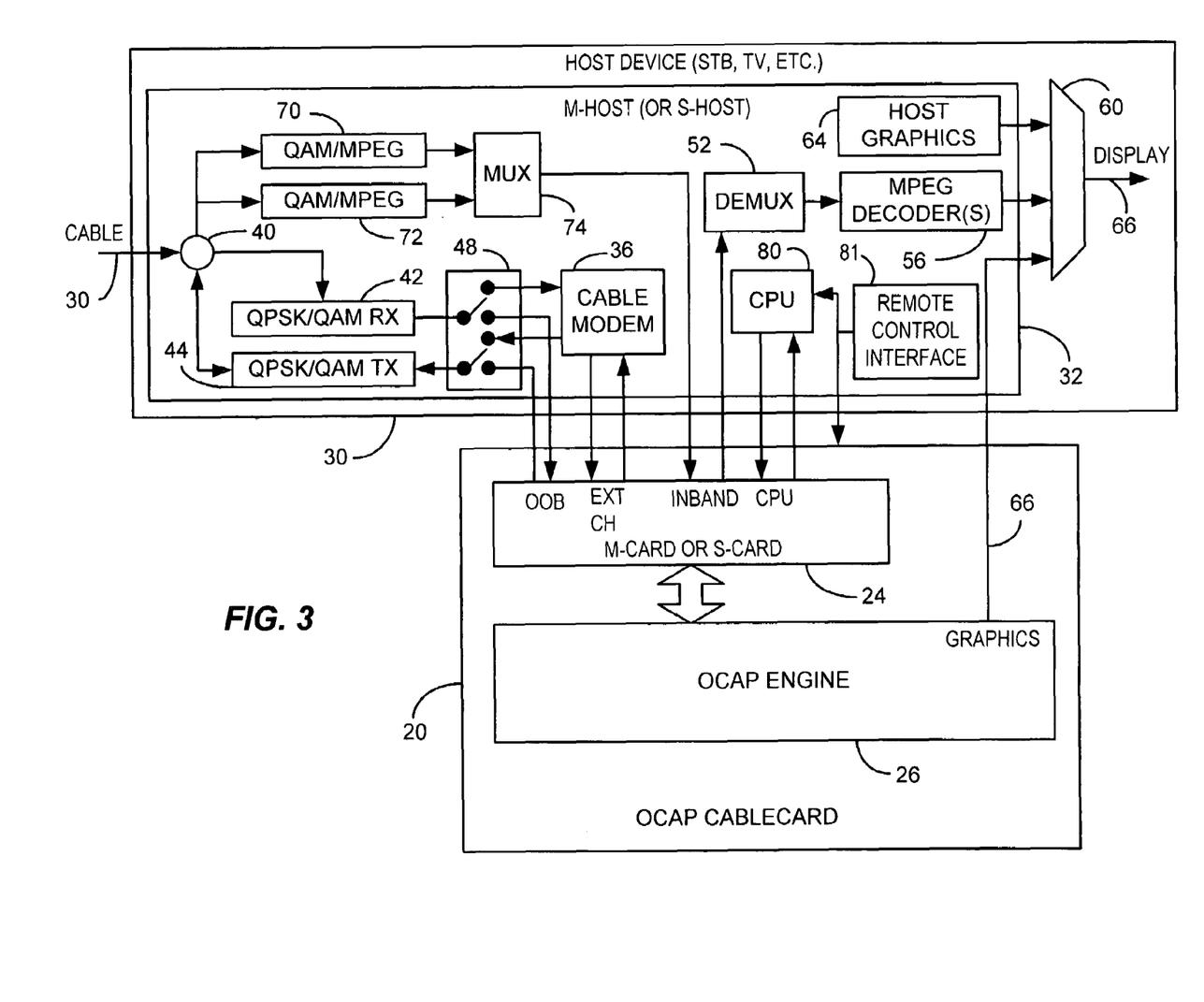
FIG. 3 shows an embodiment of an OCAP engine incorporated into an M-CARD or S-CARD in a manner consistent with certain embodiments of the present invention.

FIG. 3 shows a more detailed view of one embodiment of module 20 carrying an M-CARD or S-CARD 24 adapted to carry an OCAP engine 26 and associated functionality. An M-CARD or S-CARD provides interfaces coupling out of band (OOB) data communication with the host device 30, which contains an M-HOST or S-HOST 32, as well as communication with the host cable modem 36 (or similar if present). OOB data is communicated from the cable 38 via a diplexer or other combining circuit 40 using, for example a QPSK/QAM receiver 42 and transmitter 44. The data to and from transmitter 44 and receiver 42 can be selectively switched within the host device 30 via switches 48. In this manner, the OCAP CableCARD™ 20 can communicate either directly via the out of band channel or via the cable modem 36.

Inband data are also received by the M-CARD or S-CARD in order to carry out the conditional access functions such as decryption and the resultant decrypted output is provided to a demultiplexer 52 for decoding by one or more MPEG decoders 56. The decoded output of decoder(s) 56 are then provided to multiplexer 60. Multiplexer 60 combines the decoded output with graphics from host graphics engine 64 and graphics at 66 produced by the OCAP engine 26. Multiplexer 60 drives an internal or external display or other device at output 66 (depending upon the nature of the host).

The inband programming along with other information is received from the cable 38 through circuit 40 as QAM/MPEG data at, for example, receiver devices 70 and 72 which are multiplexed together for an M-CARD environment at multiplexer 74. For an S-CARD environment, only one receiver device 70 is needed, demultiplexer 52 can be omitted and only one MPEG decoder 56 is used.

The OCAP engine 26 on the CableCARD™ receives Java™ code, which are generally stripped from the transport stream, from the M-CARD interface (which may be received via either OOB, Inband or Cable Modem channels) and generates the appropriate operation dictated by the code. If such operation involves generation of graphics, such graphics data are supplied at line 66 to the multiplexer 60 for presentation on the display as previously described. Other functions can also be implemented using the Java™ code and such instructions can be carried out via appropriate communication between the OCAP engine 26 and the M-CARD or S-CARD 24 which may in turn provide instructions to the host CPU 80, demultiplexer 52, cable modem 36 or out of band channel. Host CPU 80 also receives commands from a remote controller (not shown) via a remote controller interface 81. OCAP module 24 receives signals from interface 81 in order to process commands from the remote controller. The CPU 80 to module 24 interface could also be used to convey this information, but might result in the OCAP code for this module not being the same as for regular set top boxes.

Figure 4:
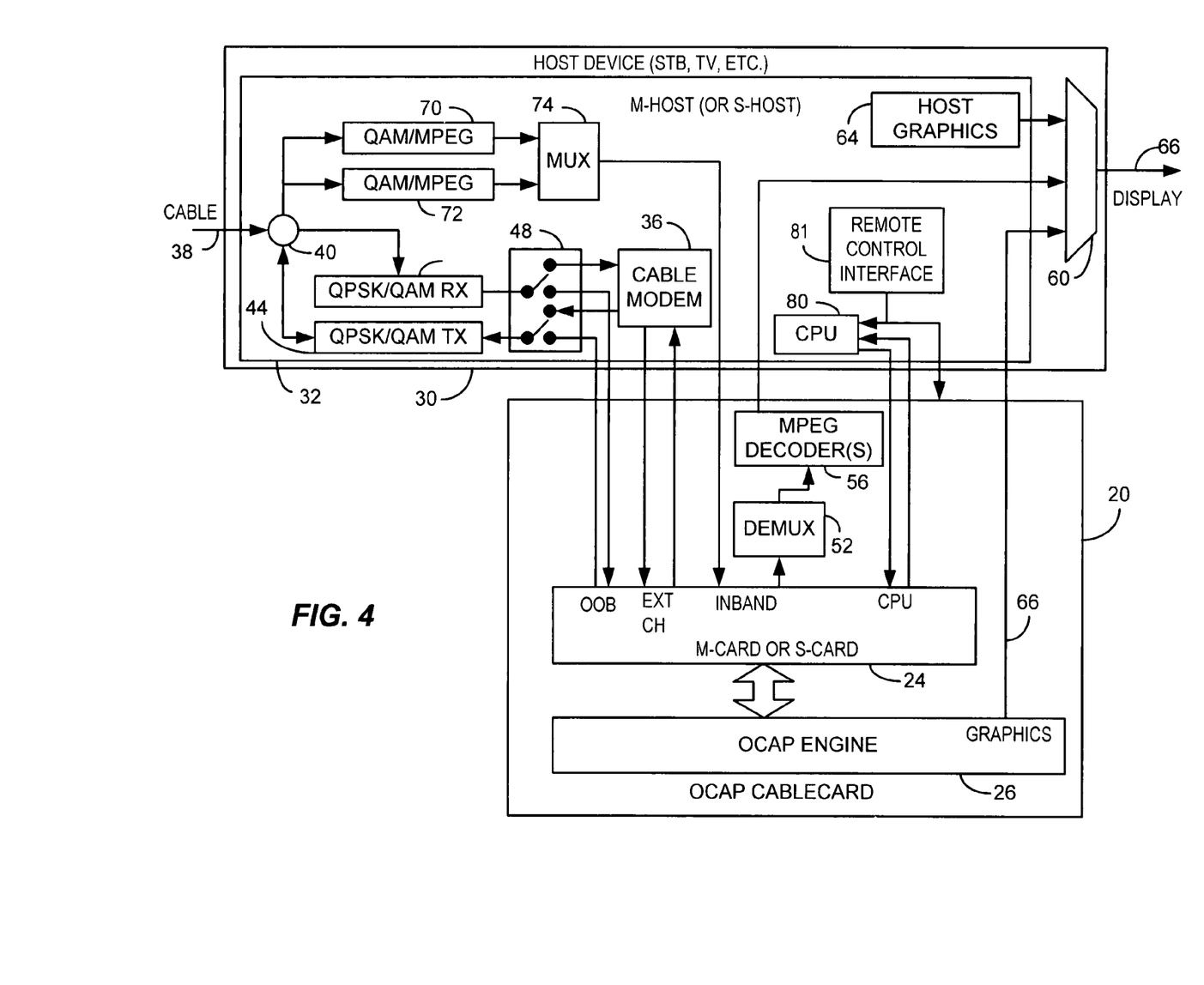
FIG. 4 shows another embodiment of an OCAP engine incorporated into an M-CARD or S-CARD in an embodiment wherein the MPEG Decoder(s) and a demultiplexer is incorporated into the PCMCIA card consistent with certain embodiments of the present invention.

Conventional CableCARDs™ utilize a PCMCIA interface that can be configured in various ways. Such interfaces do not generally provide for lines 66, so the current modification contemplates the likely use of a new interface that is similar to the PCMCIA connector with the addition of four lines for Red, Green, Blue and alpha data (or other representation for video without limitation). This will permit the full functionality of CableCARD™ devices with the additional functionality of the OCAP engine. The presence of such a connector is depicted in FIG. 3 and FIG. 4 as the presence of connections between the host and the OCAP CableCARD™. Such connector is contemplated to provide for a removable connection between the module and the host in much the same way as a standard PCMCIA connector provides, except with the addition of the video connections described above.

FIG. 4 depicts another embodiment in which an OCAP enabled CableCARD™ which also incorporates the functions of the M-CARD (or S-CARD) as well as the demultiplexer 52 (for M-CARD) and MPEG decoding functions (one decoder 56 for S-CARD, plural decoders 56 for M-CARD). This embodiment differs from that of FIG. 3 in that the demultiplexer 52 and decoder(s) 56 are a part of the CableCARD™ 20. Additionally, the display may be either internal or external in either embodiment depending upon the nature of the host. In Other variations will occur to those skilled in the art upon consideration of the present teaching.

Thus, embodiments consistent with the present invention provide a mechanism of implementing the OCAP execution engine on a CableCARD™ (or other module) while maintaining backwards compatibility with the OpenCable™ Multi-Stream or single stream CableCARD™ Interface Specification. This facilitates the creation of an "OCAP Ready" TV receiver or similar host device with an enhanced version of the CableCARD™ slot. An OCAP CableCARD™ could be provided separately from the receiver which would make the receiver OCAP compliant. Extensions to the CableCARD™ interface are used to support graphics output from the CableCARD™ and to allow control of the TV middleware such as tuners, from xlets running on the CableCARD™. Embodiments consistent with the invention may allow the MSO the opportunity to dramatically reduce testing costs by reducing the variety of different OCAP platforms attached to their network.

Embodiments can be proposed to the US Cable Industry as a deployment method for OCAP, and an alternative to embedding the OCAP stack in products. This could result in wide deployment in the US. OCAP is based on the MHP standard deployed in Europe. ARIB in Japan will also be based on MHP. OCAP is deployed in Korea. Any situation where Java™ interoperability is desired could use a similar concept to help solve interoperability problems. Thus, while the embodiments herein are described in conjunction with OCAP, they are equally applicable to other software execution environments.

Thus, an apparatus for facilitating use of OCAP (OpenCable™ Applications Platform) standard in a host cable television device, the host cable television device having a connector consistent with certain embodiments has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution.

Another embodiment of an apparatus for facilitating use of OCAP (OpenCable™ Applications Platform) standard in a host cable television device, the host cable television device having a connector consistent with the invention has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ M-CARD conditional access functions resides on the removable module. The module side connector further has connections suitable for carrying M-CARD compatible signals.

Another embodiment of an apparatus for facilitating use of OCAP (OpenCable™ Applications Platform) standard in a host cable television device, the host cable television device having a connector has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ S-CARD conditional access functions resides on the removable module. Tthe module side connector further has connections suitable for carrying M-CARD compatible signals.

A further embodiment of an apparatus for facilitating use of OCAP (OpenCable™ Applications Platform) standard in a host cable television device, the host cable television device having a connector has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ M-CARD conditional access functions resides on the removable module. The module side connector further has connections suitable for carrying M-CARD compatible signals. The Java™ code instructions are relayed to the OCAP engine through the circuitry that implements the OpenCable™ M-CARD conditional access functions. A demultiplexer receives MPEG data from the host cable television device via the circuitry that implements the OpenCable™ M-CARD functions. A plurality of MPEG decoders receive and decode the plurality of MPEG video data streams from the demultiplexer.

Yet a further apparatus consistent with certain embodiments for facilitating use of OCAP (OpenCable™ Applications Platform) standard in a host cable television device, the host cable television device having a connector has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ S-CARD conditional access functions resides on the removable module. The module side connector further has connections suitable for carrying M-CARD compatible signals. The Java™ code instructions are relayed to the OCAP engine through the circuitry that implements the OpenCable™ S-CARD conditional access functions. An MPEG decoder receives and decodes an MPEG video data streams from the host cable television device.

Certain embodiments help reduce problems inherent in OCAP interoperability testing by decoupling the Java™ execution from the host device CPU, putting it under control of network operator and thus allowing them to control the number of client platforms they need to test on.

Certain elements of the embodiments described herein, are or may be implemented using a programmed processor executing programming instructions that are broadly described above in flow chart form that can be stored on any suitable electronic or computer readable storage medium and / or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Also, while certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. An apparatus for facilitating use of an OCAP (Open Cable Applications Platform) compliant processing environment in a host cable television device, the host cable television device having a connector, comprising in combination:
a removable module;
an OCAP engine residing on the removable module suitable for execution of a segment of Java compliant program code as specified by the OCAP specification;
a module side connector affixed to the removable module, the connector being suitable for mating with the connector of the host device;
the module side connector having connections suitable for carrying graphics video data from the OCAP engine to the host device suitable presentation to a video display; and
the module side connector further having connections suitable for carrying the segment of Java compliant program code instructions to the OCAP engine for execution.

2. The apparatus according to claim 1, further comprising circuitry implementing OpenCable compliant M-CARD conditional access functions residing on the removable module.

3. The apparatus according to claim 2, wherein the Java compliant program code instructions are relayed through the circuitry that implements the OpenCable compliant M-CARD conditional access functions to the OCAP engine.

4. The apparatus according to claim 2, wherein the removable module further comprises a demultiplexer that receives MPEG data from the host cable television device and demultiplexes the MPEG data into a plurality of MPEG video data streams.

5. The apparatus according to claim 4, further comprising a plurality of MPEG decoders that receive and decode the plurality of MPEG video data streams from the demultiplexer.

6. The apparatus according to claim 3, wherein the removable module further comprises a demultiplexer that receives MPEG data from the host cable television device via the circuitry that implements the OpenCable compliant M-CARD functions and demultiplexes the MPEG data into a plurality of MPEG video data streams.

7. The apparatus according to claim 6, further comprising a plurality of MPEG decoders that receive and decode the plurality of MPEG video data streams from the demultiplexer.

8. The apparatus according to claim 1, further comprising circuitry implementing OpenCable compliant S-CARD conditional access functions residing on the removable module.

9. The apparatus according to claim 2, wherein the Java compliant program code instructions are relayed through the circuitry that implements the OpenCable compliant S-CARD conditional access functions to the OCAP engine.

10. The apparatus according to claim 8, wherein the Java compliant program code instructions are relayed through the circuitry that implements the OpenCable compliant M-CARD conditional access functions to the OCAP engine.

11. The apparatus according to claim 10, further comprising an MPEG decoder that receives and decodes an MPEG video data stream from the host cable television device.

12. An apparatus for facilitating use of an OCAP (Open Cable Applications Platform) compliant processing environment in a host cable television device, the host cable television device having a connector, comprising in combination:
a removable module;
an OCAP engine residing on the removable module suitable for execution of Java compliant program code as specified by the OCAP specification;
a module side connector affixed to the removable module, the connector being suitable for mating with the connector of the host device;
the module side connector having connections suitable for carrying graphics video data from the OCAP engine to the host device suitable presentation to a video display;
the module side connector further having connections suitable for carrying the Java compliant program code instructions to the OCAP engine for execution;
circuitry implementing OpenCable compliant M-CARD conditional access functions residing on the removable module; and
the module side connector further having connections suitable for carrying M-CARD compatible signals.

13. The apparatus according to claim 12, wherein the Java compliant program code instructions are relayed through the circuitry that implements the OpenCable compliant M-CARD conditional access functions to the OCAP engine.

14. The apparatus according to claim 12, wherein the removable module further comprises a demultiplexer that receives MPEG data from the host cable television device and demultiplexes the MPEG data into a plurality of MPEG video data steams.

15. The apparatus according to claim 14, further comprising a plurality of MPEG decoders that receive and decode the plurality of MPEG video data streams from the demultiplexer.

16. An apparatus for facilitating use of an OCAP (Open Cable Applications Platform) compliant processing environment in a host cable television device, the host cable television device having a connector, comprising in combination:
a removable module;
an OCAP engine residing on the removable module suitable for execution of Java compliant program code as specified by the OCAP specification;
a module side connector affixed to the removable module, the connector being suitable for mating with the connector of the host device;
the module side connector having connections suitable for carrying graphics video data from the OCAP engine to the host device suitable presentation to a video display;
the module side connector further having connections suitable for carrying the Java compliant program code instructions to the OCAP engine for execution;
circuitry implementing OpenCable compliant S-CARD conditional access functions residing on the removable module; and
the module side connector further having connections suitable for carrying M-CARD compatible signals.

17. The apparatus according to claim 16, wherein the Java compliant program code instructions are relayed through the circuitry that implements the OpenCable™ S-CARD conditional access functions to the OCAP engine.

18. The apparatus according to claim 17, further comprising an MPEG decoder that receives and decodes an MPEG video data stream from the host cable television device.

19. An apparatus for facilitating use of an OCAP (Open Cable Applications Platform) compliant processing environment in a host cable television device, the host cable television device having a connector, comprising in combination:
  a removable module;
  an OCAP engine residing on the removable module suitable for execution of Java compliant program code as specified by the OCAP specification;
  a module side connector affixed to the removable module, the connector being suitable for mating with the connector of the host device;
  the module side connector having connections suitable for carrying graphics video data from the OCAP engine to the host device suitable presentation to a video display;
  the module side connector further having connections suitable for carrying the Java compliant program code instructions to the OCAP engine for execution;
  circuitry implementing OpenCable compliant M-CARD conditional access functions residing on the removable module;
  the module side connector further having connections suitable for carrying M-CARD compatible signals;
  wherein the Java compliant program code instructions axe relayed to the OCAP engine through the circuitry that implements the OpenCable compliant M-CARD conditional access functions;
  a demultiplexer that receives MPEG data from the host cable television device via the circuitry that implements the OpenCable compliant M-CARD functions; and
  a plurality of MPEG decoders that receive and decode the plurality of MPEG video data streams from the demultiplexer.

20. An apparatus for facilitating use of an OCAP (Open Cable Applications Platform) compliant processing environment in a host cable television device, the host cable television device having a connector, comprising in combination:
  a removable module;
  an OCAP engine residing on the removable module suitable for execution of Java compliant program code as specified by the OCAP specification;
  a module side connector affixed to the removable module, the connector being suitable for mating with the connector of the host device;
  the module side connector having connections suitable for Carrying graphics video data from the OCAP engine to the host device suitable presentation to a video display;
  the module side Connector further having connections suitable for carrying the Java compliant program code instructions to the OCAP engine for execution;
  circuitry implementing OpenCable compliant S-CARD conditional access functions residing on the removable module;
  the module side connector further having connections suitable for carrying M-CARD compatible signals;
  wherein the Java compliant program code instructions are relayed to the OCAP engine through the circuitry that implements the OpenCable compliant S-CARD conditional access functions; and
  an MPEG decoder that receives and decodes an MPEG video data streams from the host cable television device.

21. An apparatus for facilitating use of an OCAP (Open Cable Applications Platform) compliant processing environment in a host cable television device, the host cable television device having a connector, comprising in combination:
  a removable module;
  means, residing on the removable module, for execution of OCAP compliant Java compliant program code instructions;
  a module side connector affixed to the removable module, the connector being suitable for mating with the connector of the host device;
  the module side connector having connections suitable for carrying graphics video data from the execution means to the host device; and
  the module side connector further having connections suitable for carrying the Java compliant program code instructions to the execution means for execution.

22. The apparatus according to claim 21, further comprising means residing on the removable module for implementing OpenCable compliant M-CARD conditional access functions.

23. The apparatus according to claim 22, wherein the removable module further comprises means for receiving MPEG data from the host cable television device and demultiplexing the MPEG data into a plurality of MPEG video data streams.

24. The apparatus according to claim 23, further comprising a plurality of MPEG decoders that receive and decode the plurality of MPEG video data streams Thorn the demultiplexer.

25. The apparatus according to claim 1, further comprising means residing on the removable module for implementing OpenCable compliant S-CARD conditional access functions.

26. The apparatus according to claim 10, further comprising MPEG decoding means that receives and decodes an MPEG video data stream from the host cable television device.

* * * * *

UNITED STATES PATENT AND TRADEMARK OFFICE
CERTIFICATE OF CORRECTION

PATENT NO. : 7,593,469 B2
APPLICATION NO. : 11/297588
DATED : September 22, 2009
INVENTOR(S) : Williams et al.

It is certified that error appears in the above-identified patent and that said Letters Patent is hereby corrected as shown below:

Col. 9, line 22, delete "axe" and insert -- are -- therefor.

Col. 9, line 45, delete "Carrying" and insert -- carrying -- therefor.

Col. 9, line 47, delete "Connector" and insert -- connector -- therefor.

Col. 10, line 40, delete "Thorn" and insert -- from -- therefor.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,593,469 B2
APPLICATION NO. : 11/297588
DATED : September 22, 2009
INVENTOR(S) : Williams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-first Day of September, 2010

David J. Kappos
*Director of the United States Patent and Trademark Office*